(12) United States Patent
Huang et al.

(10) Patent No.: US 11,565,683 B2
(45) Date of Patent: Jan. 31, 2023

(54) QUICK-DETACHABLE BRAKE FLUID TEST STRUCTURE

(71) Applicants: Chia Hsun Huang, Changhua County (TW); Shih Hsiang Chien, Changhua County (TW)

(72) Inventors: Chia Hsun Huang, Changhua County (TW); Shih Hsiang Chien, Changhua County (TW)

(73) Assignee: PEACEFUL THRIVING ENTERPRISE CO., LTD., Changhua County (TW)

( * ) Notice: Subject to any disclaimer, the term of this patent is extended or adjusted under 35 U.S.C. 154(b) by 184 days.

(21) Appl. No.: 17/137,909

(22) Filed: Dec. 30, 2020

(65) Prior Publication Data
US 2022/0203953 A1    Jun. 30, 2022

(51) Int. Cl.
*B60T 17/22* (2006.01)
(52) U.S. Cl.
CPC .................. *B60T 17/221* (2013.01)
(58) Field of Classification Search
CPC .................................................. B60T 17/221
See application file for complete search history.

(56) References Cited

U.S. PATENT DOCUMENTS

| | | | | |
|---|---|---|---|---|
| 3,958,454 | A | * | 5/1976 | Rasch ........................ G01L 5/28 73/121 |
| 5,028,144 | A | * | 7/1991 | Klein .................. G01N 33/2847 374/10 |
| 5,380,091 | A | * | 1/1995 | Buchanan ............... G01N 25/08 73/61.76 |
| 6,651,487 | B1 | * | 11/2003 | Petty ..................... G01N 21/293 73/61.77 |
| 2002/0017129 | A1 | * | 2/2002 | Duff ...................... B60T 17/221 73/40 |
| 2019/0061728 | A1 | * | 2/2019 | Chien ..................... B60T 17/22 |
| 2022/0055599 | A1 | * | 2/2022 | Moorman ............... B60T 17/22 |

* cited by examiner

*Primary Examiner* — Eric S. McCall
(74) *Attorney, Agent, or Firm* — Che-Yang Chen; Law Office of Michael Chen

(57) ABSTRACT

A quick-detachable brake fluid test structure comprising a body and a front assembly body, the body has at least one front assembly hole and at least one front fixing member, and is provided with at least one connecting plate and a fixing seat inside, a conductive wire is assembled on the connecting plate, and at least one temperature sensor is disposed on the fixing seat. The front assembly body is disposed at a position of a front end of the body, a side of the front assembly body is formed with at least one fixing hole communicating with the front assembly hole and provided for the front fixing member to be assembled and fixed. The front assembly body is provided with a front sleeve, and accommodated with a heating element and a heat conductive pipe respectively connected to the connecting plate and the temperature sensor.

8 Claims, 7 Drawing Sheets

QUICK-DETACHABLE BRAKE FLUID TEST STRUCTURE

BACKGROUND OF THE INVENTION

Field of Invention

The invention relates to a brake fluid test structure, and more particularly to a quick-detachable brake fluid test structure that is convenient for disassembly, assembly and replacement to reduce maintenance costs and material costs.

Related Art

For vehicles, the brake system is a very important mechanism, the brake system mainly uses a brake fluid to generate an average braking force, and the brake system is also an important mechanism to avoid accidents during driving, so whether it is bicycle, motorcycle, automobile or other means of transportation, they require routine maintenance or repair or inspection of the brake system to keep the brake system in an optimum condition to ensure driving safety. Therefore, the brake fluid tester is an important tool for checking the brake system. The brake fluid tester is used to detect the brake fluid to prevent driving accidents. However, the probe of the conventional brake fluid tester on the market is integrated with the test equipment or tool, and inside the probe is equipped with a temperature-sensitive metal member and a heating wire spring. The heating wire spring is electrically connected to a circuit board of the test equipment through a wire, and the temperature-sensitive metal member is also electrically connected to the circuit board by a wire. Therefore, when the heating wire spring of the brake fluid tester is damaged and needs to be repaired, the heating wire spring cannot be replaced directly, the entire set of probe needs to be replaced, and when the probe is replaced, the temperature-sensitive metal member and the heating wire spring need to be unsoldered from the circuit board before the probe can be removed and replaced. Then, the replacement probe needs to be electrically connected by soldering the wire with the circuit board. Therefore, when the conventional brake fluid tester is damaged, the users or consumers cannot replace it by themselves, the brake fluid tester must be sent to the original factory to have the entire set of probe replaced, which causes problems of difficulty in maintenance, long disassembly and assembly man-hours, and maintenance and replacement costs.

Therefore, how to solve the above-mentioned problems and drawbacks in the prior art is what the inventor of the invention and relevant manufacturers engaged in this industry are eager to research and make improvement.

SUMMARY OF THE INVENTION

Therefore, in order to effectively solve the above-mentioned problems, a main object of the invention is to provide a quick-detachable brake fluid test structure that is convenient for disassembly, assembly and replacement to reduce maintenance costs and material costs.

In order to achieve the above object, the invention provides a quick-detachable brake fluid test structure comprising a body and a front assembly body, wherein the body is formed with at least one front assembly hole at a side of a front end, the body is disposed with at least one front fixing member at a position of the front assembly hole, inside the body is provided with at least one connecting plate and a fixing seat, a conductive wire is assembled on the connecting plate, and at least one temperature sensor is disposed on the fixing seat. The front assembly body is disposed at a position of the front end of the body, a side of the front assembly body is formed with at least one fixing hole, the fixing hole communicates with the front assembly hole, the front fixing member is assembled in the fixing hole after passing through the front assembly hole to fix the front assembly body at a position of the front end of the body. In addition, the front assembly body is provided with a front sleeve, inside the front assembly body and the front sleeve are disposed with a heating element and a heat conductive pipe, and the heating element and the heat conductive pipe are respectively connected to the connecting plate and the temperature sensor. Thereby the quick-detachable brake fluid test structure is capable of heating a brake fluid and conducting heat energy through the front assembly body, and the front assembly body is capable of quickly disassembling and assembling with the body through the front fixing member, and therefore achieving an efficacy of convenient disassembly, assembly and replacement to reduce maintenance costs and material costs.

According to one embodiment of the quick-detachable brake fluid test structure of the invention, wherein the front end of the body is formed with at least one front assembly hole and disposed with at least one front fixing member.

According to one embodiment of the quick-detachable brake fluid test structure of the invention, wherein the side of the front assembly body is formed with at least one fixing hole communicating with the front assembly hole and provided for the front fixing member to be assembled to fix the front assembly body at the front end of the body.

According to one embodiment of the quick-detachable brake fluid test structure of the invention, wherein inside the body is further provided with a temperature-sensitive fixing member, the temperature-sensitive fixing member is assembled on the fixing seat by an inner fixing member, and one end of the temperature sensor is assembled on the temperature-sensitive fixing member and the fixing seat.

According to one embodiment of the quick-detachable brake fluid test structure of the invention, wherein the fixing seat is positioned inside the body by at least one inner positioning member.

According to one embodiment of the quick-detachable brake fluid test structure of the invention, wherein an accommodating passage is formed inside the front assembly body for the heat conductive pipe to pass through, a communicating groove is formed on the fixing seat, and one end of the heat conductive pipe is assembled in the communicating groove and contacts the temperature sensor.

According to one embodiment of the quick-detachable brake fluid test structure of the invention, wherein at least one heating extension is formed at one end of the heating element.

According to one embodiment of the quick-detachable brake fluid test structure of the invention, wherein the heating element is provided with an extension tube formed of conductive material on the heating extension, the extension tube is electrically connected to the connecting plate, and a material hardness of the extension tube is greater than a material hardness of the heating extension.

According to one embodiment of the quick-detachable brake fluid test structure of the invention, wherein a sleeve pipe is further provided inside the front sleeve, an inner passage is formed inside the sleeve pipe, and an outer passage is formed between the sleeve pipe and the front sleeve, the heating element is accommodated inside the inner passage, the sleeve pipe is a metal pipe, a front end of the front sleeve is formed with a plurality of guide holes communicating with the inner passage and the outer passage, and a front sleeve through hole is formed on a side of the front sleeve to communicate with the outer passage.

According to one embodiment of the quick-detachable brake fluid test structure of the invention, wherein at least one front sleeve fixing hole is formed on the side of the front assembly body, at least one front sleeve assembling hole is formed on the side of the front sleeve to communicate with the front sleeve fixing hole, and the front sleeve is provided with at least one front sleeve fixing member passing through the front sleeve assembling hole and assembled with the front sleeve fixing hole to fix the front sleeve on the front assembly body.

DETAILED DESCRIPTION OF THE INVENTION

Figure 1:
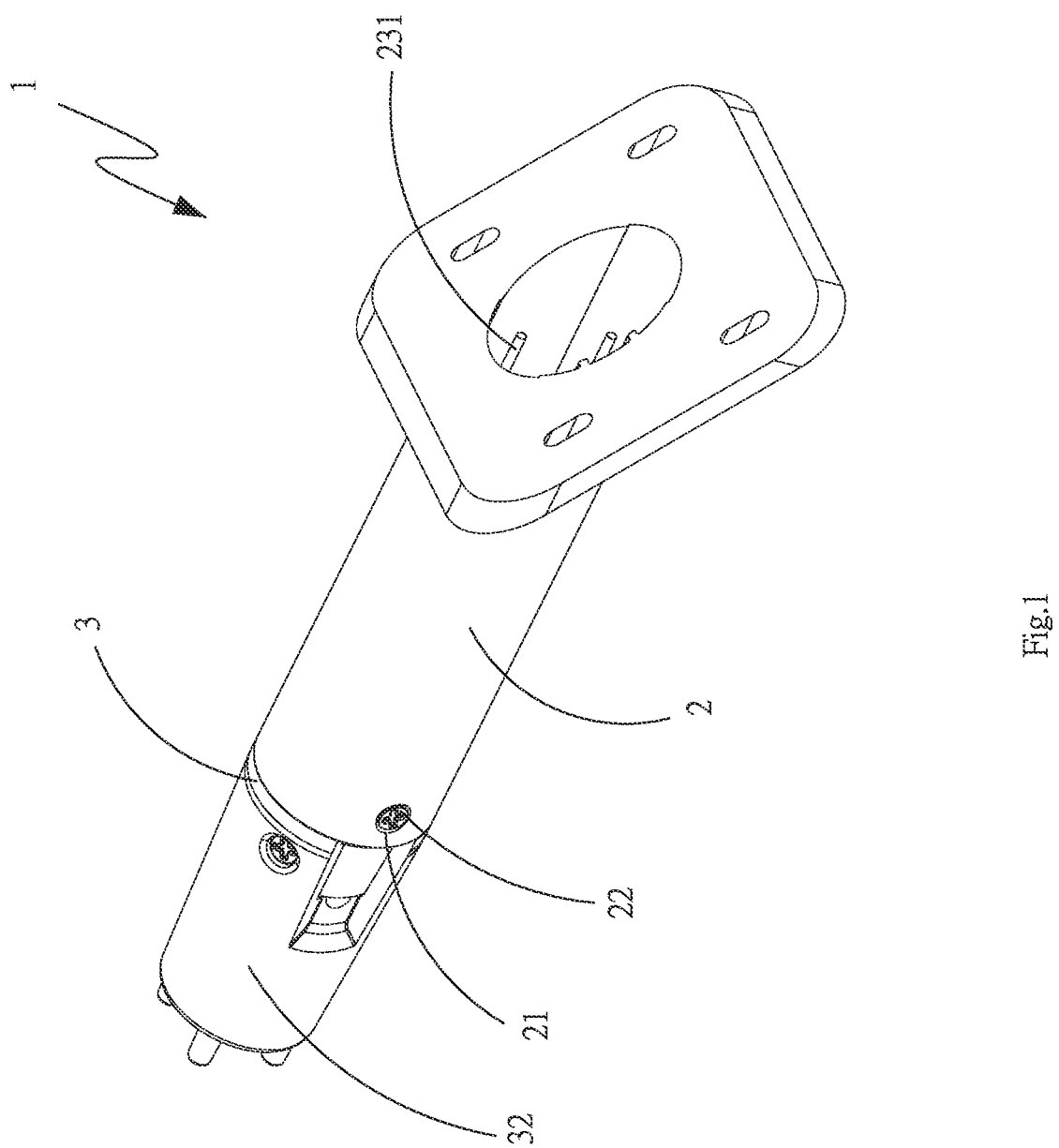
FIG. 1 is a perspective assembly view of a quick-detachable brake fluid test structure of the invention.
Figure 2:
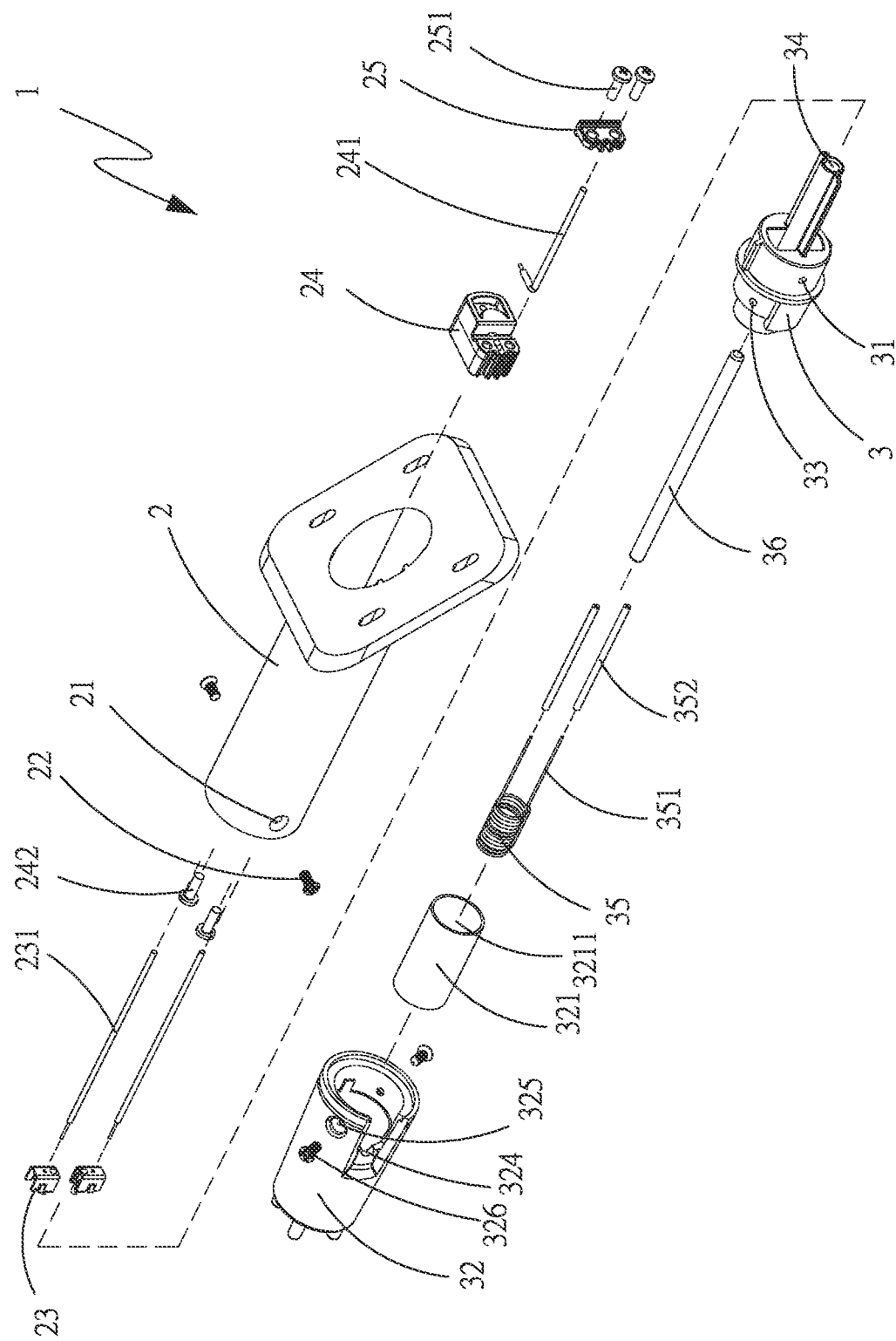
FIG. 2 is a perspective exploded view of the quick-detachable brake fluid test structure of the invention.
Figure 3:
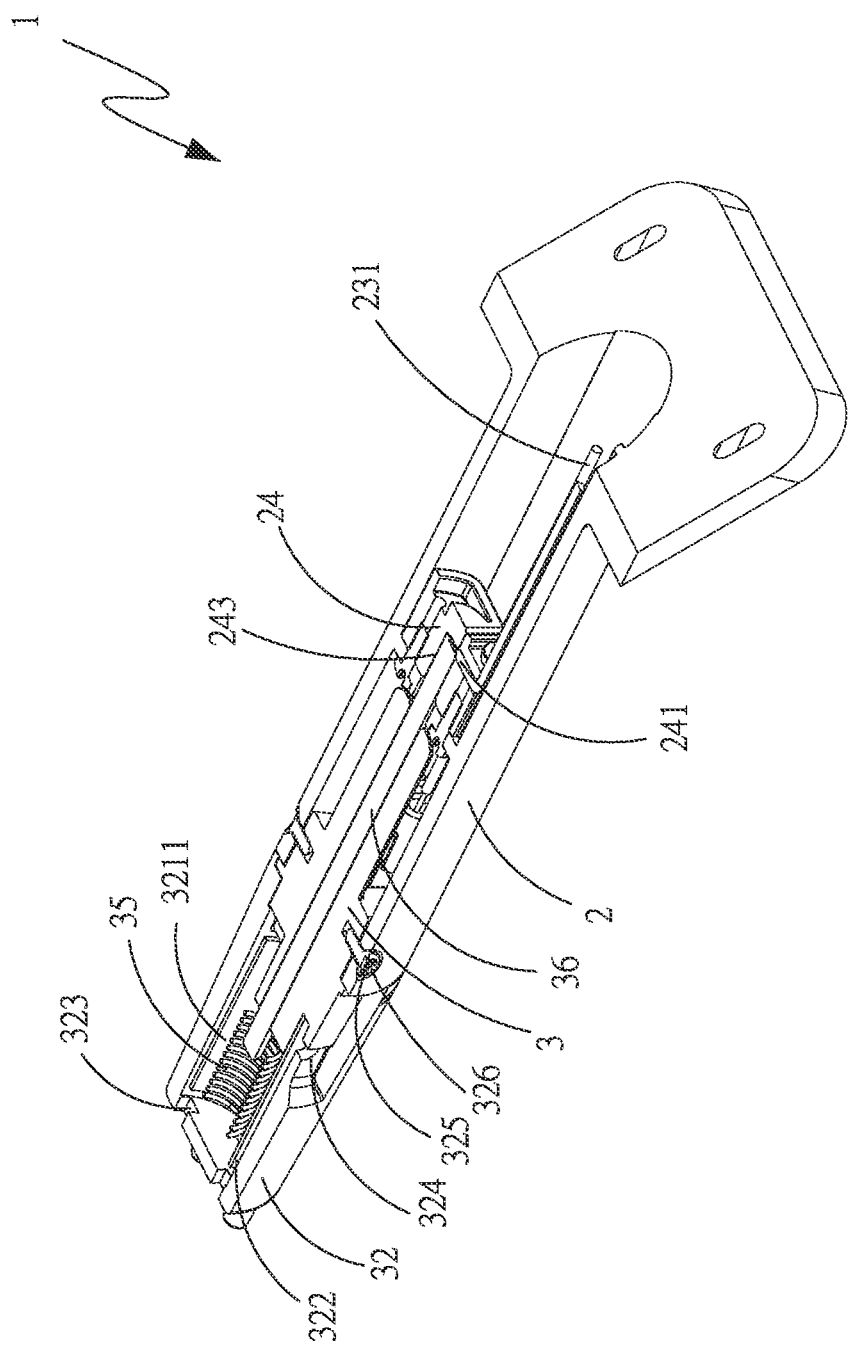
FIG. 3 is a cross-sectional assembly view of the quick-detachable brake fluid test structure of the invention.
Figure 4:
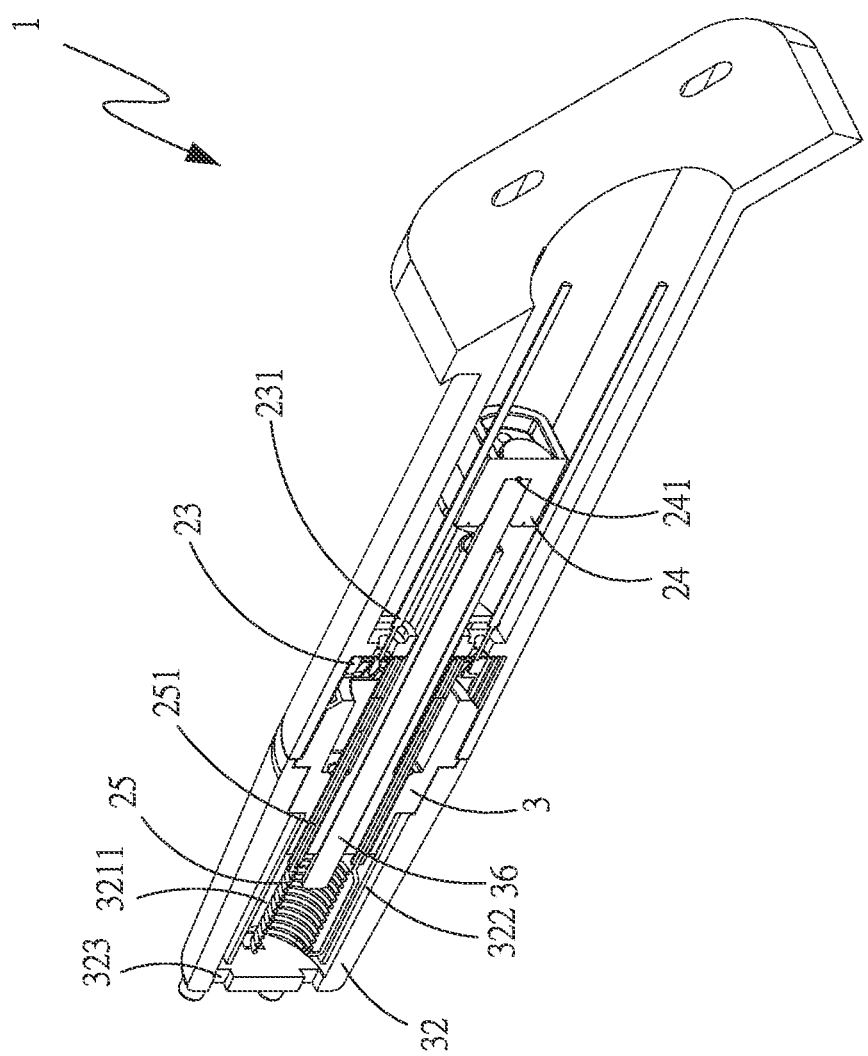
FIG. 4 is a cross-sectional assembly view of another angle of the quick-detachable brake fluid test structure of the invention.

The above objects of the invention, as well as its structural and functional features, will be described in accordance with the preferred embodiments of the accompanying drawings.

First, please refer to FIGS. 1 to 4 for a perspective assembly view, a perspective exploded view, a cross-sectional assembly view, and a cross-sectional assembly view of another angle of a quick-detachable brake fluid test structure of the invention respectively, wherein a quick-detachable brake fluid test structure 1 comprises a body 2 and a front assembly body 3.

Wherein the body 2 is formed with at least one front assembly hole 21 at a position of a side of a front end, the body 2 is disposed with at least one front fixing member 22 at a position of the front assembly hole 21, and inside the body 2 is provided with at least one connecting plate 23 and a fixing seat 24. Wherein the connecting plate 23 is a metal connecting plate capable of conducting electricity, and the fixing seat 24 can be formed inside the body 2 or a single component. In this embodiment, the fixing seat 24 is a single component disposed inside the body 2. The connecting plate 23 is provided with a conductive wire 231 accommodated inside the body 2, the fixing seat 24 is provided with a temperature sensor 241 accommodated inside the body 2, the temperature sensor 241 is a K-type thermocouple in this embodiment, but it is not limited thereto, the temperature sensor 241 can be any sensor capable of sensing a temperature inside the body 2, and the fixing seat 24 is provided with an inner positioning member 242 assembled on the body 2 so that the fixing seat 24 can be fixedly disposed inside the body 2. Inside the body 2 is further provided with a temperature-sensitive fixing member 25, the temperature-sensitive fixing member 25 is provided with an inner fixing member 251, and the temperature-sensitive fixing member 25 and the temperature sensor 241 are assembled on the fixing seat 24 by the inner fixing member 251, so that one end of the temperature sensor 241 is assembled on the temperature-sensitive fixing member 25 and the fixing seat 24. A communicating groove 243 is formed inside the fixing seat 24, and one end of the temperature sensor 241 is correspondingly accommodated in the communicating groove 243.

Wherein the front assembly body 3 is disposed at a position of the front end of the body 2, at least one fixing hole 31 is formed on a side of the front assembly body 3, the fixing hole 31 communicates with the front assembly hole 21, and the front fixing member 22 is assembled in the fixing hole 31 after passing through the front assembly hole 21 to fixedly dispose the front assembly body 3 at the front end of the body 2. A front sleeve 32 is provided at a position of a front end of the front assembly body 3, at least one front sleeve fixing hole 33 is formed on the side of the front assembly body 3 and an accommodating passage 34 is formed inside the front assembly body 3. Inside the front assembly body 3 and the front sleeve 32 are disposed with a heating element 35 and a heat conductive pipe 36, the heating element 35 is a heating wire spring, a front end of the heating element 35 is accommodated inside the front sleeve 32, and a rear end of the heating element 35 is formed with at least one heating extension 351. Wherein the heating extension 351 can also be directly electrically connected to the connecting plate 23, but because the heating element 35 as a heating wire spring and the heating extension 351 are formed with a soft conductive material, when only the heating extension 351 is electrically connected to the connecting plate 23, there may be displacement and poor contact due to the soft material, so the heating element 35 is covered with an extension tube 352 on the heating extension 351. The extension tube 352 is a capillary tube formed with a conductive material, and a material hardness of the extension tube 352 is greater than a material hardness of the heating extension 351. The heating element 35 can be electrically connected to the connecting plate 23 through the extension tube 352, and the extension tube 352 passes through the front assembly body 3 and is electrically connected to the connecting plate 23 so that the heating element 35 can be stably electrically connected to the connecting plate 23 and the conductive wire 231 through the extension tube 352 to ensure the conduction of electric power. The heat conductive pipe 36 passes through the accommodating passage 34 and one end of the heat conductive pipe 36 is accommodated in the communicating groove 243 and is in contact with the temperature sensor 241. Inside the front sleeve 32 is further provided with a sleeve pipe 321, an inner passage 3211 is formed inside the sleeve pipe 321, an outer passage 322 is formed between the sleeve pipe 321 and the front sleeve 32, the heating element 35 is accommodated in the inner passage 3211, and the sleeve pipe 321 is a metal pipe. A plurality of guide holes 323 are formed at a front end of the front sleeve 32 to communicate with the inner passage 3211 and the outer passage 322, and a front sleeve through hole 324 is formed on a side of the front sleeve 32 to communicate with the outer passage 322. At least one front sleeve assembling hole 325 is formed on the side of the front sleeve 32 to communicate with the front sleeve fixing hole 33, and the front sleeve 32 is provided with at least one front sleeve fixing member 326 passing through the front sleeve assembling hole 325 and assembled with the front sleeve fixing hole 33 to fix the front sleeve 32 on the front assembly body 3.

Figure 5:
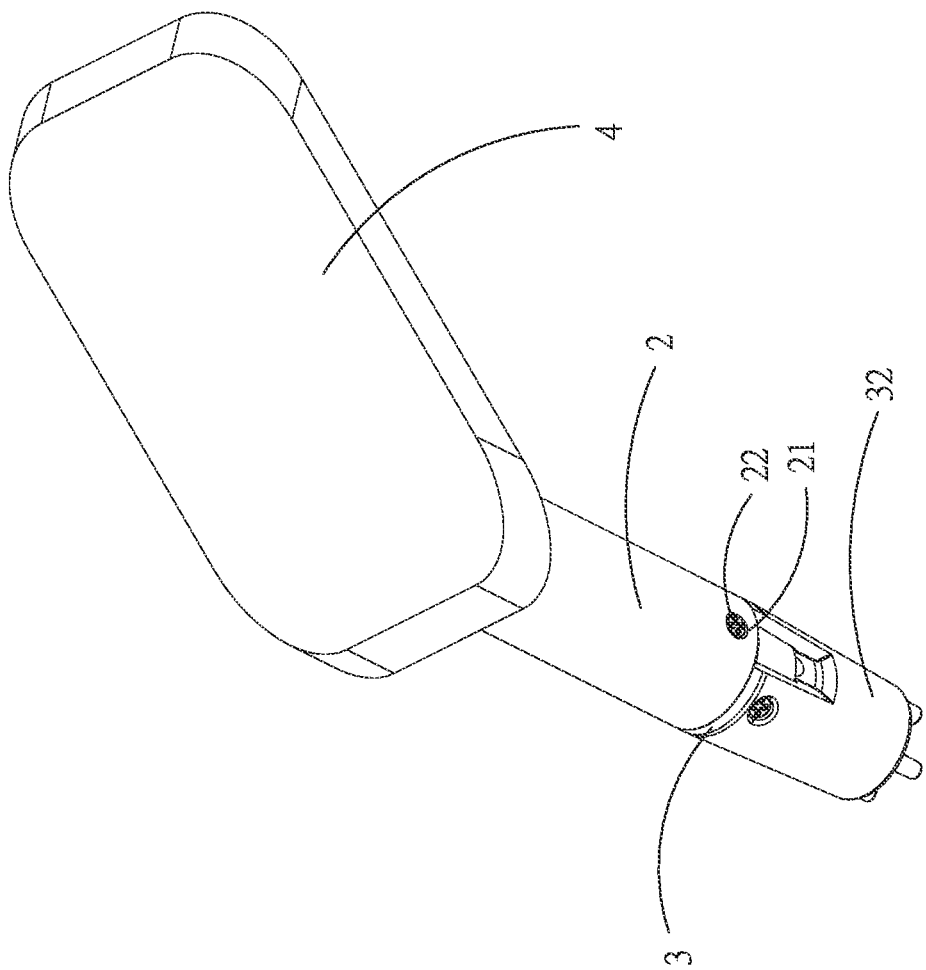
FIG. 5 is a first schematic diagram of implementation of the quick-detachable brake fluid test structure of the invention.

Please refer to the aforementioned figures and FIG. 5, which is a first schematic diagram of implementation of the quick-detachable brake fluid test structure 1 of the invention. Wherein when the quick-detachable brake fluid test structure 1 is used, the body 2 and a test machine 4 are assembled with each other, the temperature sensor 241 and the conductive wire 231 are electrically connected to a test machine board of the test machine 4, and then the front sleeve 32 of the quick-detachable brake fluid test structure 1 can be inserted into a brake fluid to be tested and the test machine 4 is activated. When the test machine 4 provides an electric power, the electric power is transmitted to the connecting plate 23 through the conductive wire 231, and the connecting plate 23 transmits the electric power to the extension tube 352. The extension tube 352 is capable of reliably transmitting the electric power of the connecting plate 23 to the heating extension 351, so that the heating element 35 generates heat energy, the brake fluid to be tested can be heated by the heating element 35, and the brake fluid to be tested will circulate through the front sleeve through hole 324, the inner passage 3211, the outer passage 322 and the guide holes 323 continuously and will be heated continuously. One end of the heat conductive pipe 36 absorbs a heat energy of the brake fluid to be tested in the inner passage 3211 and transmits the heat energy to another end of the heat conductive pipe 36. The temperature sensor 241 contacted by the other end of the heat conductive pipe 36 receives a temperature of the heat conductive pipe 36 and transmits a temperature signal to the test machine board, so that the test machine board can receive a heating condition of the brake fluid to be tested. Additionally, wherein the temperature sensor 241 mainly receives a temperature of the heat conductive pipe 36, so the temperature sensor 241 can also be disposed on the test machine board to sense a temperature of the heat conductive pipe 36.

Figure 6:
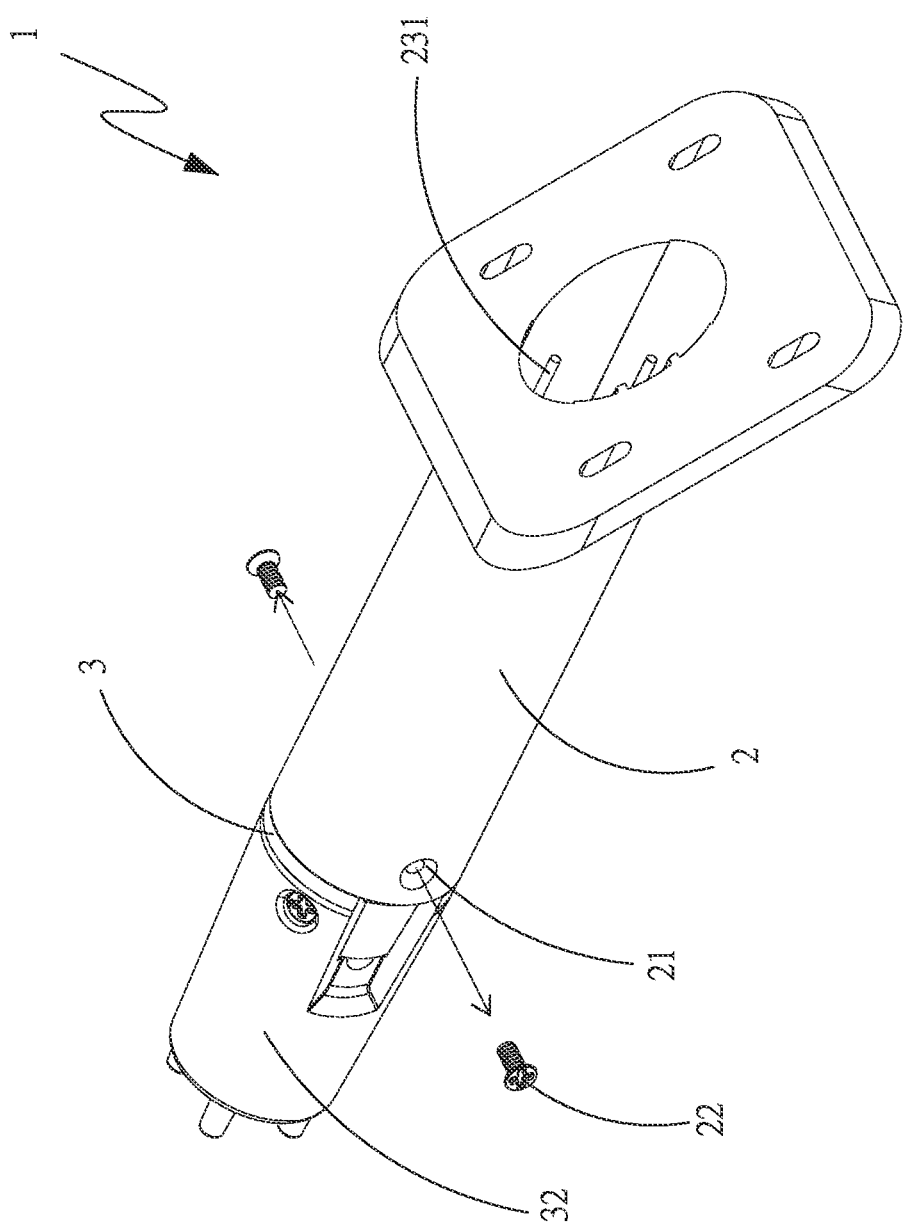
FIG. 6 is a second schematic diagram of implementation of the quick-detachable brake fluid test structure of the invention.
Figure 7:
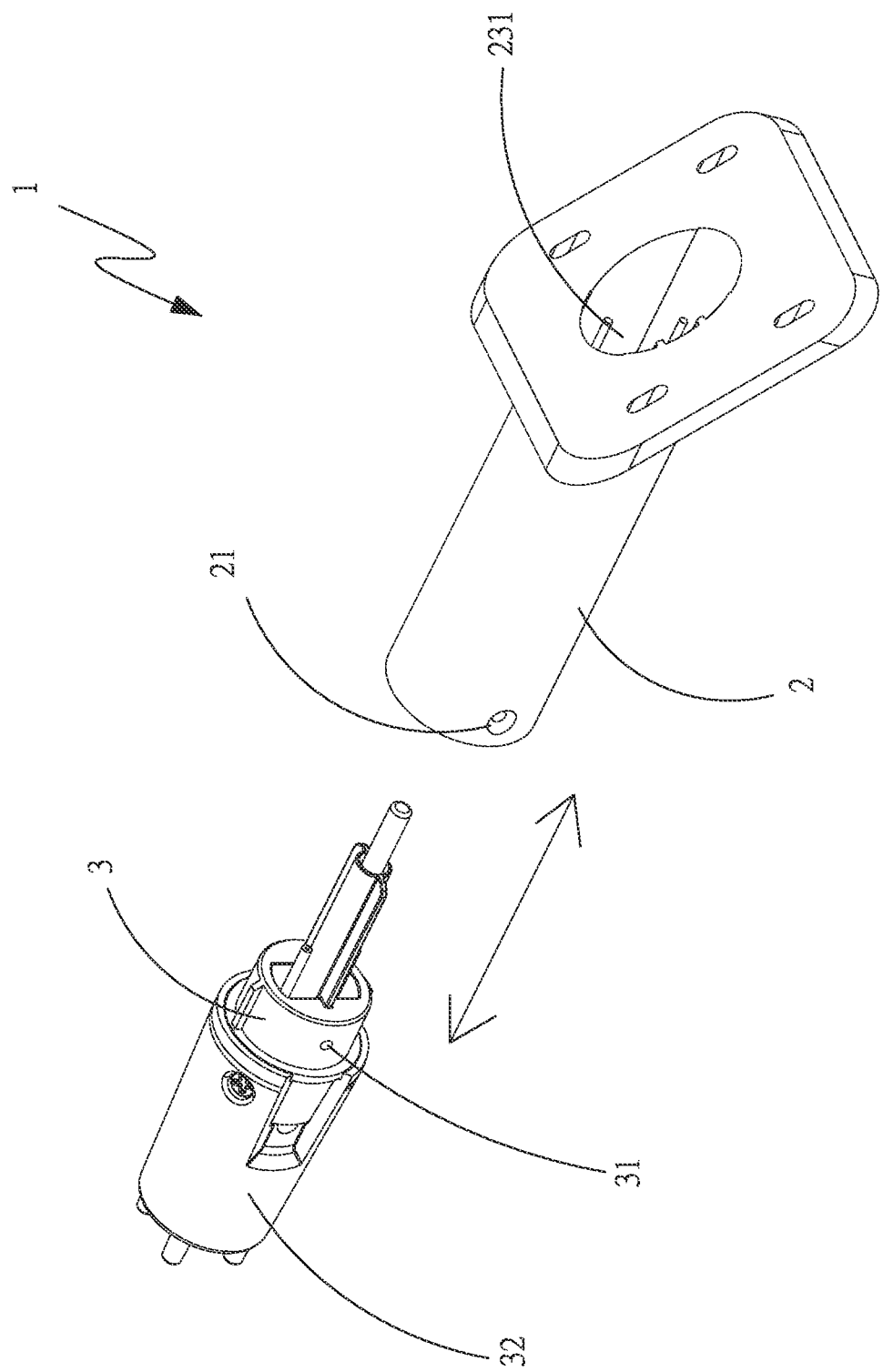
FIG. 7 is a third schematic diagram of implementation of the quick-detachable brake fluid test structure of the invention.

Please refer to the aforementioned figures and FIGS. 6 and 7, which are a second schematic diagram of implementation and a third schematic diagram of implementation of the quick-detachable brake fluid test structure 1 of the invention respectively. Wherein when the heating element 35 of the quick-detachable brake fluid test structure 1 is damaged, the front fixing member 22 can be disassembled from the front assembly hole 21 and the fixing hole 31, and then the front assembly body 3 is disassembled from the body 2, and a new set of the front assembly body 3 can be replaced and disposed on the body 2, thereby the quick-detachable brake fluid test structure 1 is capable of heating the brake fluid and conducting heat energy through the front assembly body 3, and is capable of quickly disassembling from the body 2 and assembling on the body 2 through the front fixing member 22, so that the components of the quick-detachable brake fluid test structure 1 can be replaced by users or consumers themselves according to disassembly and assembly modes, and steps of unsoldering the conductive wire 231 and the temperature sensor 241 from the test machine board can be eliminated, thereby achieving an efficacy of convenient disassembly, assembly and replacement to reduce maintenance costs and material costs.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. A quick-detachable brake fluid test structure comprising:
   a body, inside the body having at least one connecting plate and a fixing seat, a conductive wire being disposed on the connecting plate, and a temperature sensor being disposed on the fixing seat; and
   a front assembly body, the front assembly body being disposed at a front end of the body, the front assembly body being disposed with a front sleeve, and inside the front assembly body and the front sleeve being disposed with a heating element and a heat conductive pipe respectively connected to the connecting plate and the temperature sensor;
   wherein at least one heating extension is formed at one end of the heating element;
   the heating element is provided with an extension tube formed of conductive material on the heating extension;
   the extension tube is electrically connected to the connecting plate; and
   a material hardness of the extension tube is greater than a material hardness of the heating extension.

2. The quick-detachable brake fluid test structure as claimed in claim 1, wherein the front end of the body is formed with at least one front assembly hole and disposed with at least one front fixing member.

3. The quick-detachable brake fluid test structure as claimed in claim 1, wherein a side of the front assembly body is formed with at least one fixing hole communicating with the front assembly hole and provided for the front fixing member to be assembled to fix the front assembly body at the front end of the body.

4. The quick-detachable brake fluid test structure as claimed in claim 1, wherein inside the body is further provided with a temperature-sensitive fixing member, the temperature-sensitive fixing member is assembled on the fixing seat by an inner fixing member, and one end of the temperature sensor is assembled on the temperature-sensitive fixing member and the fixing seat.

5. The quick-detachable brake fluid test structure as claimed in claim 1, wherein the fixing seat is positioned inside the body by at least one inner positioning member.

6. The quick-detachable brake fluid test structure as claimed in claim 1, wherein an accommodating passage is formed inside the front assembly body for the heat conductive pipe to pass through, a communicating groove is formed on the fixing seat, and one end of the heat conductive pipe is assembled in the communicating groove and contacts the temperature sensor.

7. The quick-detachable brake fluid test structure as claimed in claim 1, wherein a sleeve pipe is further provided inside the front sleeve, an inner passage is formed inside the sleeve pipe, and an outer passage is formed between the sleeve pipe and the front sleeve, the heating element is accommodated inside the inner passage, the sleeve pipe is a metal pipe, a front end of the front sleeve is formed with a plurality of guide holes communicating with the inner passage and the outer passage, and a front sleeve through hole is formed on a side of the front sleeve to communicate with the outer passage.

8. The quick-detachable brake fluid test structure as claimed in claim 1, wherein at least one front sleeve fixing hole is formed on the side of the front assembly body, at least one front sleeve assembling hole is formed on the side of the front sleeve to communicate with the front sleeve fixing hole, and the front sleeve is provided with at least one front sleeve fixing member passing through the front sleeve assembling hole and assembled with the front sleeve fixing hole to fix the front sleeve on the front assembly body.

* * * * *